US008819590B2

(12) United States Patent
Ohkubo et al.

(10) Patent No.: US 8,819,590 B2
(45) Date of Patent: Aug. 26, 2014

(54) IMAGE DISPLAY APPARATUS AND IMAGE DISPLAY METHOD

(75) Inventors: Hiromasa Ohkubo, Kanagawa (JP); Akitsugu Komiyama, Tokyo (JP); Takayuki Shinohara, Tokyo (JP); Hidehiko Morisada, Tokyo (JP); Takashi Umeda, Tokyo (JP); Takahiro Moriyama, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 238 days.

(21) Appl. No.: 13/154,715

(22) Filed: Jun. 7, 2011

(65) Prior Publication Data

US 2012/0011472 A1     Jan. 12, 2012

(30) Foreign Application Priority Data

Jul. 7, 2010   (JP) ................................ 2010-155275

(51) Int. Cl.
   *G06F 3/048*      (2013.01)
(52) U.S. Cl.
   USPC ........................................................ 715/838
(58) Field of Classification Search
   CPC ..................................................... G06F 3/048
   USPC ................................................ 715/838, 730
   See application file for complete search history.

(56) References Cited

U.S. PATENT DOCUMENTS

| | | | |
|---|---|---|---|
| 7,970,240 B1 * | 6/2011 | Chao et al. | 382/305 |
| 2005/0120655 A1 * | 6/2005 | Wolff et al. | 52/311.1 |
| 2005/0134945 A1 * | 6/2005 | Gallagher | 358/527 |
| 2005/0283742 A1 * | 12/2005 | Gusmorino et al. | 715/839 |
| 2006/0103650 A1 * | 5/2006 | Kamiwada et al. | 345/427 |
| 2006/0224703 A1 * | 10/2006 | Sugimoto | 709/219 |
| 2010/0058213 A1 * | 3/2010 | Higuchi et al. | 715/766 |
| 2011/0126156 A1 * | 5/2011 | Krishnaraj et al. | 715/828 |

FOREIGN PATENT DOCUMENTS

| | | |
|---|---|---|
| JP | 10-307936 | 11/1998 |
| JP | 2002-117416 | 4/2002 |
| JP | 2006-153923 | 6/2006 |
| JP | 2006-209319 | 8/2006 |
| JP | 2006-238474 | 9/2006 |
| JP | 2008-11033 | 1/2008 |
| JP | 2008-46519 | 2/2008 |
| JP | 2010-128587 | 6/2010 |

OTHER PUBLICATIONS

Notification of Reason(s) for Refusal dated Jun. 12, 2012, from corresponding Japanese Application No. 2010-155275.
Notification of Reason(s) for Refusal dated Apr. 17, 2012, from corresponding Japanese Application No. 2010-155275.

* cited by examiner

*Primary Examiner* — William Bashore
*Assistant Examiner* — Jeanette J Parker
(74) *Attorney, Agent, or Firm* — Katten Muchin Rosenman LLP

(57) ABSTRACT

In an image display apparatus, an image classification unit generates one or more of image groups by classifying image data to which attribution information is added based on the attribute information. A display control unit displays, on a display device, a list of a plurality of thumbnail images of the image data included in each of the image groups generated by the image classification unit, in a manner in which the plurality of thumbnail images are piled up for every image group. Herein, the display control unit acquires the predetermined number of sheets of image data from the selected image group to display, on the display device, the image data as a background image in which the image data are arranged.

6 Claims, 13 Drawing Sheets

| FILE NAME | | XXXXXXXX | |
|---|---|---|---|
| TYPE | | PANORAMA IMAGE | |
| IMAGE-TAKEN DATE AND HOUR | YEAR | XXXX | |
| | MONTH | X | |
| | DAY | XX | |
| | TIME | XX HOUR XX MINUTE XX SECOND | |
| OBJECT | PERSON 1 | NAME | MASAO |
| | | BIRTH DATE | X/X, 19XX |
| | ⋮ | ⋮ | ⋮ |
| | PERSON N | NAME | KEIKO |
| | | BIRTH DATE | X/X, 20XX |
| | FLOWER | PRESENT | |
| | FACE | 2 | |
| | ⋮ | ⋮ | |
| | SKY | PRESENT | |
| ALBUM | ALBUM 1 | SELECTED | |
| | ⋮ | ⋮ | |
| | ALBUM N | NOT SELECTED | |
| NUMBER OF PIXELS | WIDTH | XXXX PIXELS | |
| | HEIGHT | XXXX PIXELS | |
| DISPLAY STATE | | TO BE DISPLAYED | |

IMAGE DISPLAY APPARATUS AND IMAGE DISPLAY METHOD

BACKGROUND OF THE INVENTION

1. Field of the Invention

The present invention relates to an image processing apparatus and an image processing method.

2. Description of the Related Art

With the wide spread of image-taking apparatuses, such as digital cameras and cellular phones with a camera, in recent years, users can readily acquire digital image data. Even with the camera function of a cellular phone with a camera, the digital image data of about several million pixels can be taken; and with a compact digital camera, the digital image data of more than ten million pixels can be taken. Further, high-end single-lens reflex cameras, which have been used mainly in professional applications, are being widely used by ordinary users.

Along with the spread of such image-taking apparatuses, there are increasing occasions when digital image data are taken. For example, some of the users who have established their blogs take several ten or several hundred shots of digital image data per day. As understood from what has been described so far, the number of the digital image data to be taken is explosively increasing. On the other hand, the recording apparatuses with a large capacity in which a large amount of such digital image data can be recorded are also being widely used.

When a large amount of image data are stored in a recording apparatus, there can be the case where it takes a long time for a user to search for the desired image. Also, there can be the case where a user forgets what type of images have been recorded in the recording apparatus. As stated above, when the number of the image data stored in a recording apparatus is large, there is sometimes the case where it is difficult to manage the image data.

SUMMARY OF THE INVENTION

The present invention has been made in view of these situations, and a purpose of the invention is to provide a technique in which a large amount of digital image data can be readily managed.

In order to solve the aforementioned problem, an embodiment of the present invention is an image processing apparatus. The apparatus comprises: a first display control unit configured to display a list of thumbnail images of image data on a display device; a direction receiving unit configured to acquire a user's selection for the image data; and a second display control unit configured to display a list of thumbnail images of one or more of image data that have been selected by the user, in a display region different from the display region on the display device where the thumbnail images to be displayed by the first display control unit are displayed, and simultaneously with the display of the thumbnail images to be displayed by the first display control unit. Herein, the first display control unit acquires the user's selection from the direction receiving unit and displays, on the display device, the thumbnail images of the image data that have been selected by the user and the thumbnail images of the image date that have not been selected by the user, in different display modes.

Another embodiment of the present invention is an image processing method executable by a processor. The method comprises: displaying a list of thumbnail images of image data on a display device; acquiring a user's selection for the image data; displaying a list of thumbnail images of one or more of image data that have been selected by the user, in a display region different from the display region where the thumbnail images to be displayed are displayed on the display device, and simultaneously with the display of the thumbnail images of the image data; and displaying, on the display device, the thumbnail images of the image data that have been selected by the user and the thumbnail images of the image data that have not been selected by the user, in different display modes.

Still another embodiment of the present invention is an image display apparatus. The apparatus comprises: a number-of-pixel acquisition unit configured to acquire the number of pixels of image data stored in a storage device; an aspect ratio acquisition unit configured to acquire the aspect ratio of the image data; and a display control unit configured to display a list a plurality of thumbnail images of the image data on a display device. Herein, the display control unit displays a thumbnail image of image data having more pixels as a larger thumbnail image than that of image data having less pixels, while keeping the aspect ratio of the image data.

Still another embodiment of the present invention is an image display method executable by a processor. The method comprises: acquiring the number of pixels of image data stored in a storage device; acquiring the aspect ratio of the image data; and displaying, on a display device, a list of a plurality of thumbnail images of the image data having more pixels as a larger thumbnail image than that of the image data having less pixels, while keeping the aspect ratio of the image data.

Still another embodiment of the present invention is also an image display apparatus. The apparatus comprises: a number-of-pixel acquisition unit configured to acquire the number of pixels of image data stored in a storage device; and an image display control unit configured to generate a plurality of thumbnail images in a manner in which an enlargement/reduction ratio used when a thumbnail image of image data with more pixels is to be generated is made smaller than that used when the thumbnail image of the image data with less pixels is to be generated, and to display a list of the generated thumbnail images on a display device.

Still another embodiment of the present invention is also an image display apparatus. The apparatus comprises: an image classification unit configured to classify image data to which attribute information is added into groups based on the attribute information so as to generate one or more image groups; and a display control unit configured to display, on a display device, a list of a plurality of thumbnail images of the image data included in each of the image groups generated by the image classification unit, in a manner in which the plurality of thumbnail images are piled up for every image group.

Still another embodiment of the present invention is also an image display apparatus. The apparatus comprises: a display of a list control unit configured to display, on a display device, a list of a plurality of thumbnails of the image data to which attribute information is added, the image data being stored in a storage device; a direction receiving unit configured to acquire a user selection for the image data; and a display control unit configured to acquire, from the storage device, the predetermined number of sheets of image data including attribute information associated with the attribute information included in a selected image, to arrange the predetermined number of sheets of image data within a virtual three-dimensional space, and to display, on the display device, a walk-through video of the predetermined number of sheets of image data.

Still another embodiment of the present invention is also an image display method executable by a processor. The method comprises: generating one or more of image groups by classifying image data to which attribution information is added into groups based on the attribute information; and displaying, on a display device, a list of a plurality of thumbnail images of the image data included in each of the generated image groups, in a manner in which the plurality of thumbnail images are piled up for every image group.

It is noted that any combination of the aforementioned components or any manifestation of the present invention exchanged between methods, devices, systems, computer programs, data structures, recording media, and so forth, is also effective as an embodiment of the present invention.

BRIEF DESCRIPTION OF THE DRAWINGS

Embodiments will now be described, by way of example only, with reference to the accompanying drawing, which are meant to be exemplary, not limiting, in which:

FIG. 3 is a view schematically illustrating the structure of a database in which the attribute information provided to image data are stored;

DETAILED DESCRIPTION OF THE INVENTION

The invention will now be described by reference to the preferred embodiments. This does not intend to limit the scope of the present invention, but to exemplify the invention.

An image processing apparatus according to an embodiment provides various techniques for managing image data, such as a user interface for displaying a list of image data stored in a storage device, function of classifying images based on the attribute information added to the images, user interface for helping selection of images, and slide show for browsing images.

Figure 1:
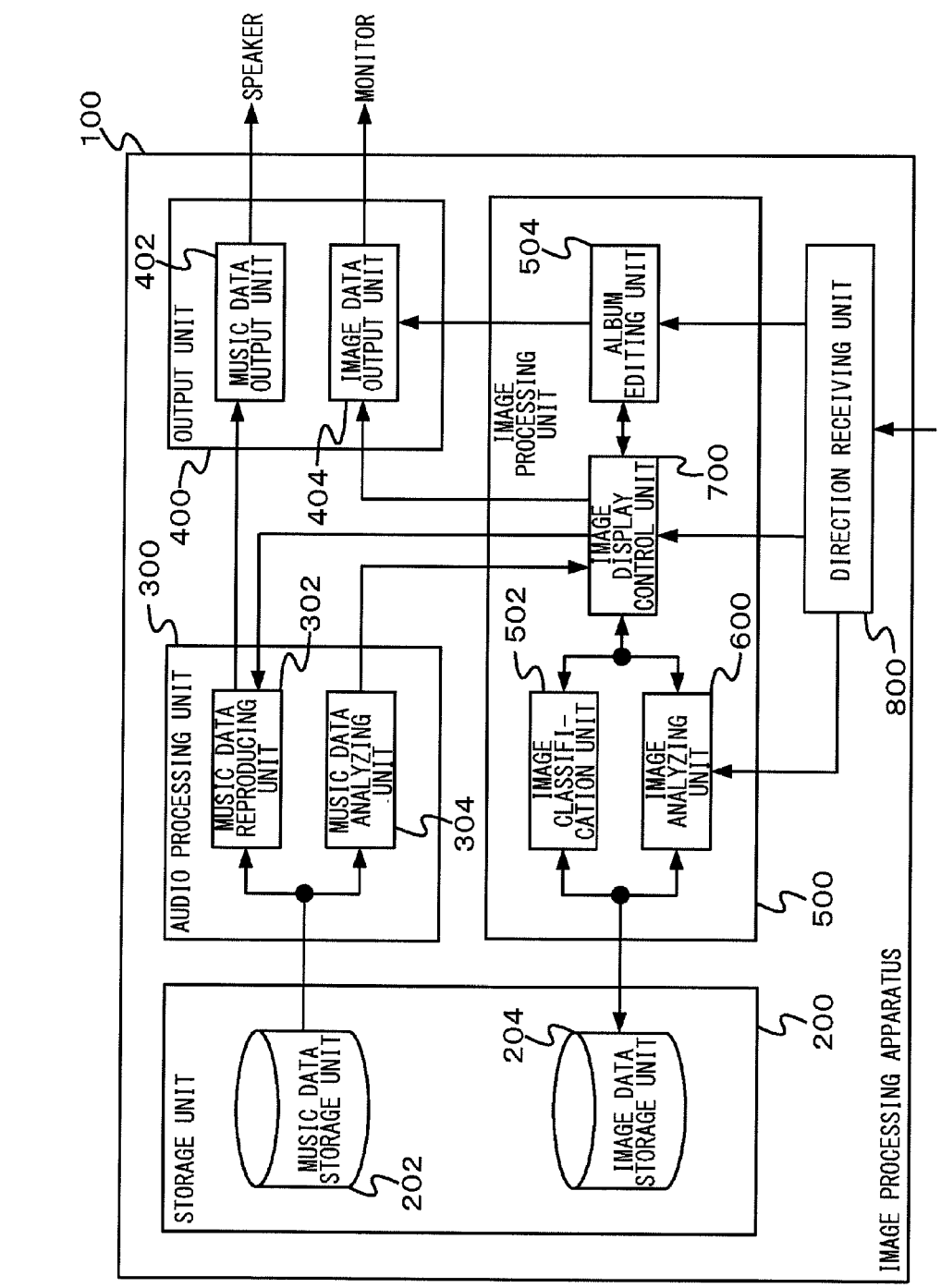
FIG. 1 is a view schematically illustrating the internal structure of an image processing apparatus according to an embodiment.

FIG. 1 is a view schematically illustrating the internal structure of an image processing apparatus 100 according to an embodiment. The image processing apparatus 100 according to the embodiment comprises a storage unit 200, an audio processing unit 300, an output unit 400, an image processing unit 500, and a direction receiving unit 800. FIG. 1 illustrates the functional configuration for achieving the image processing apparatus 100 according to the embodiment, in which other configurations are omitted. In FIG. 1, each component described as a functional block for performing various processing can be configured with a CPU (Central Processing Unit), a main memory, and other LSIs (Large Scale Integrations) in terms of hardware, and realized with a program loaded in the main memory, etc., in terms of software. Accordingly, it will be understood by a person skilled in the art that these functional blocks can be realized in various forms by only hardware, only software, or combination of hardware and software. Therefore, each functional block should not be limited to any one of these.

The storage unit 200 includes a music data storage unit 202 and an image data storage unit 204. The music data storage unit stores music data that is BGM (Back Ground Music) to be reproduced simultaneously with the display of a slide show, which will be described later. The image data storage unit 204 stores digital image data mainly taken by a user. The storage unit 200 can be realizable with a storage device, such as HDD (Hard Disk Drive), SSD (Solid State Drive), or the like, and a removable recording medium, such as Blu-ray Disc (trademark), etc.

The audio processing unit 300 includes a music data reproducing unit 302 and a music data analyzing unit 304. The music data reproducing unit 302 reproduces the music data acquired from the music data storage unit 202. The music data analyzing unit 304 analyzes the characteristics of the music data reproduced by the music data reproducing unit 302. Herein, the "characteristics of the music data" means a characteristic amount extracted from the waveform that the music data uniquely has. Examples of the characteristics thereof include, for example, music tempo, chord progression, and frequency distribution, etc. The above analysis can be achieved by using a known technique, such as a twelve-tone analysis.

The output unit 400 further includes a music data output unit 402 and an image data output unit 404. The music data output unit 402 is an interface for outputting the music reproduced by the music data reproducing unit 302 to speakers. The image data output unit 404 is an interface for outputting the image generated by the image processing unit 500 to a display device, such as a television set, monitor, or the like, and an example of the image data output unit 404 is, for example, an HDMI (High-Definition Multimedia Interface) terminal.

The direction receiving unit 800 acquires a direction for the image processing apparatus 100, which has been issued by a user through a user interface, such as a non-illustrated mouse, keyboard, game controller, or the like.

The image processing unit 500 performs a series of image processing, such as display of a list of image data, classification of image data, and reproduction of a slide show, based on the direction acquired from the user through the direction receiving unit 800. To do that, the image processing unit 500 includes an image classification unit 502, an image analyzing unit 600, an image display control unit 700, and an album editing unit 504.

Figure 2:
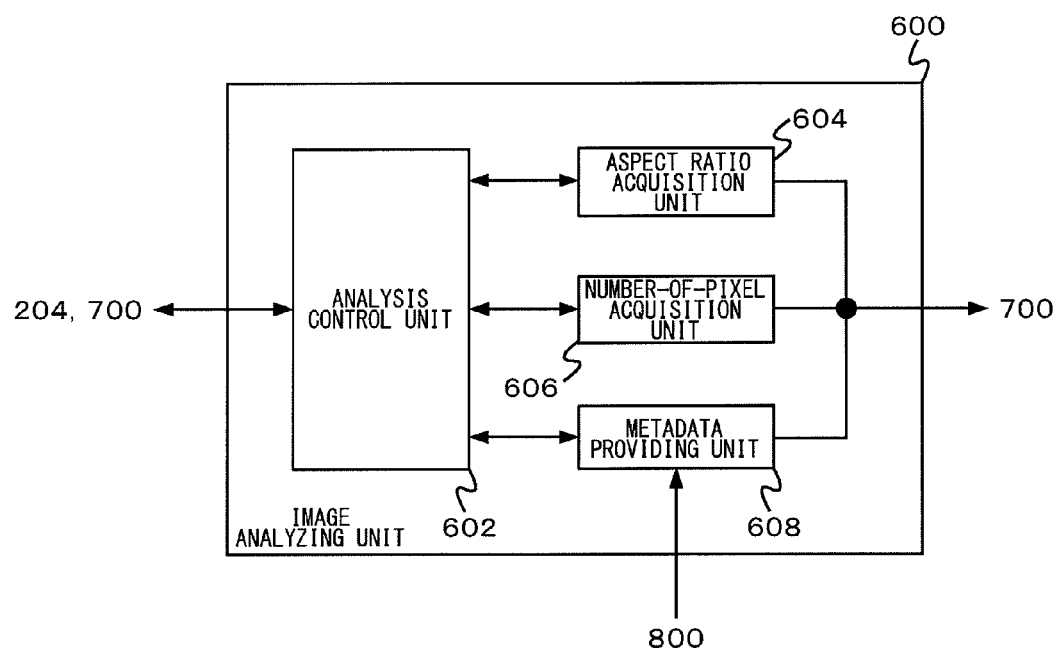
FIG. 2 is a view schematically illustrating the internal structure of an image analyzing unit.

FIG. 2 is a view schematically illustrating the internal structure of the image analyzing unit 600. The image analyzing unit 600 includes an analysis control unit 602, an aspect ratio acquisition unit 604, a number-of-pixel acquisition unit 606, and a metadata providing unit 608.

The aspect ratio acquisition unit 604 acquires the aspect ratio of the image data stored in the image data storage unit 204. The number-of-pixel acquisition unit 606 acquires the total number of pixels of the image data stored in the image data storage unit 204. Specifically, when it is assumed that the number of pixels in the width direction of certain image data is W pixels and that in the height direction thereof is H pixels, the aspect ratio acquisition unit 604 determines the aspect ratio of the image data to be W:H. In addition, the number-of-pixel acquisition unit 606 determines the total number of pixels of the image data as W×H pixels.

The metadata providing unit 608 provides, as metadata, attribute information to each image data stored in the image data storage unit 204, the attribute information indicating the characteristics of each image data. The details of the attribute information and a method of providing the information will be described later. The analysis control unit 602 controls the operations of the image analyzing unit 600. Specifically, the analysis control unit 602 acquires a direction from the image processing unit 500 to activate the aspect ratio acquisition unit 604 and the number-of-pixel acquisition unit 606, so that the aspect ratio and the number of pixels of image data are outputted to the image processing unit 500. In addition, when a new image is added in the image data storage unit 204, the analysis control unit 602 activates the metadata providing unit 608 to provide attribute information to the added image.

FIG. 3 is a view schematically illustrating the structure of a database in which the attribute information provided to image data are stored. The attribute information to be provided to image data is tied with the corresponding image data and stored in the image data storage unit 204. As illustrated in FIG. 3, the attribute information includes a file name, type, image-taken date and hour, object, album, number of pixels, and display state.

The "type" is the information indicating what type of manner image data has been generated in. The types of image data include at least an "ordinary image", "panorama image", "three-dimensional image", and "moving image". The "ordinary image" represents ordinary two-dimensional image data, for example, such as JPEG image and BMP image. Although the "panorama image" is also two-dimensional image data, the number of pixels in the width direction is large relative to that in the height direction in comparison with an ordinary image. The "panorama mage" is generated by being synthesized from multiple ordinary images taken, for example, while a viewpoint is continuously being changed.

The "three-dimensional image" is an image including a parallax image for the left eye and that for the right eye in which an object has been taken from different viewpoints. Herein, an image of an object in a three-dimensional space, which is viewed from different viewpoints, is referred to as a "parallax image". Because the left and right eyes of a person are spaced apart about 6 cm, parallax is generated between the image viewed from the left eye and that viewed from the right eye. It is said that the brain of a person recognizes the depth of an object by using the parallax images sensed with the left and right eyes. Accordingly, when the parallax image of an object sensed with the left eye and that sensed with the right eye are projected on the respective eyes, the object is recognized as a three-dimensional image having a depth by the person. The "three-dimensional image" can provide a three-dimensional image to a user by being displayed on a dedicated display device, such as a three-dimensional television set.

The "moving image" is a video including images continuous in the time direction, and examples thereof include, for example, MPEG 4-AVC (Advanced Video Coding) and motion JPEG, etc. Also, a video including parallax images, such as MPEG 4-MVC (Multiview Video Coding), is included in the "moving image".

The "object" is the information indicating the object taken in image data. The "object" is roughly classified into a "person" and objects other than a person. The "person" is the information on the person considered to be most important among the objects and the information of the name and birth data of the person taken in image data are stored. The metadata providing unit 608 acquires these information from a user through the direction receiving unit 800 to reflect on the database of attribute information.

Examples of the objects other than a person include, for example, a "flower" "sky", and "face", etc. The metadata providing unit 608, including an image recognition engine (not illustrated) for analyzing image data to recognize the object that has been taken therein, recognizes the object that has been taken to automatically reflect on a database of attribute information. The image recognition engine can be achieved by using a known mechanical learning method, for example, such as SVM (Support Vector Machine) and Boosting, which are learning methods with teachers. Also, a user can correct the attribute information automatically generated by the image recognition engine in the metadata providing unit 608 by issuing a direction to the metadata providing unit 608 through the direction receiving unit 800.

The "album" is the information indicating whether certain image data is included in the later-described album. The "display state" is the information indicating whether the certain image data is to be displayed. When a user sets the attribute of the certain image data to "non-display" through the direction receiving unit 800 and the metadata providing unit 608, the user cannot browse the certain image data, as far as the user does not access to the history folder that is a dedicated folder for displaying the image data whose display state is "non-display" and that is provided in the image data storage unit 204. By including a "display state" in the attribute information as stated above, a user can manage images that are not intended to be usually used for browsing, etc., but not intended to be deleted from the image data storage unit 204. The history folder can be treated as something like a so-called "negative film" that is saved without being printed in digital image data.

When acquiring a direction from the image display control unit 700, the image classification unit 502 in FIG. 1 accesses to the database in which the aforementioned attribute information are stored, and divides the image data into groups by classifying them based on the attribute information provided thereto. For example, the image classification unit 502 classifies the image data stored in the image data storage unit 204 based on the image-taken data and hour thereof. Alternatively, the image classification unit 502 can freely divide the image data into groups with the attribute information being a key, such as classification of the image data in which a specific person is taken into one group, and division of the image data in which a flower is taken into one group, etc.

Further, the image classification unit 502 may extract a characteristic amount of image data by analyzing it to classify the image data based on the characteristic amount. Specifically, the image classification unit 502 determines the hue distribution of each image data to collect and divide the image date in which, for example, "red color" is dominant into one group. Alternatively, the image classification unit 502 may determine the luminance distribution of each image data to collect and divide the image data that are dark as a whole into one group. This is advantageous in terms of being able to evoke a user's new awareness to image data by providing the image data classified from various viewpoints to the user.

Further, the characteristic amount extracted by the image classification unit 502 can be reflected on the aforementioned database as new attribute information. By accumulating the attribute information from various viewpoints, a group of the image data classified based on the combinations of the attribute information can provide a further new awareness to a user.

Figure 4:
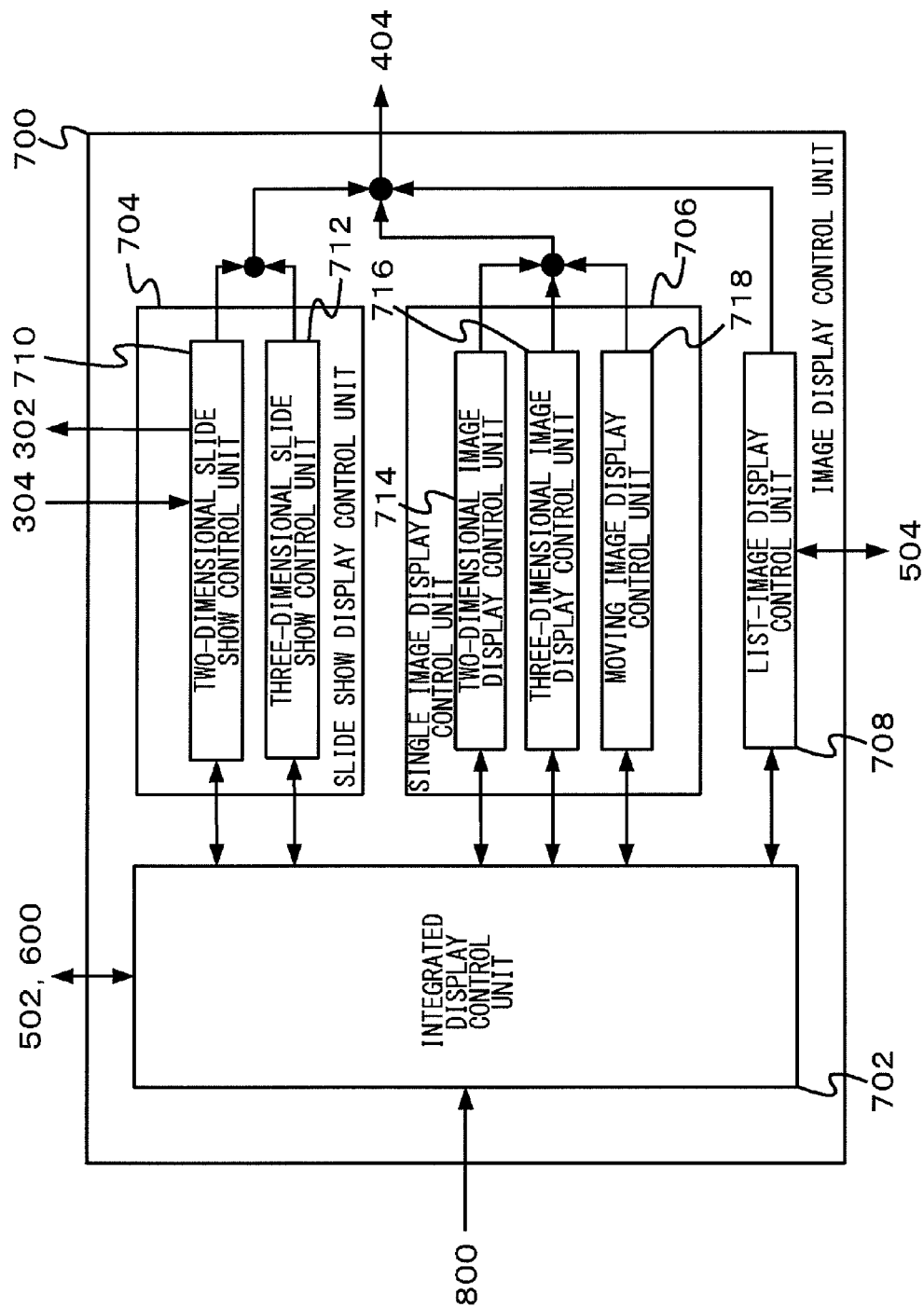
FIG. 4 is a view schematically illustrating the internal structure of an image display control unit.

FIG. 4 is a view schematically illustrating the internal structure of the image display control unit 700. The image display control unit 700 includes an integrated display control unit 702, a slide show display control unit 704, a single image display control unit 706, and a list-image display control unit 708.

The integrated display control unit 702 controls the operations of the image display control unit 700 based on the directions from a user acquired trough the direction receiving unit 800. The integrated display control unit 702 further acquires the image data to be displayed from the image data storage unit 204 through the image classification unit 502. The integrated display control unit 702 further acquires, from the image analyzing unit 600, the information on the resolution and aspect ratio, etc., of the image to be displayed.

Unless a particular direction from a user is provided, for example, immediately after the activation of the image processing apparatus 100, the integrated display control unit 702 makes the list-image display control unit 708 display a list of all image data stored in the image data storage unit 204.

Figure 5:
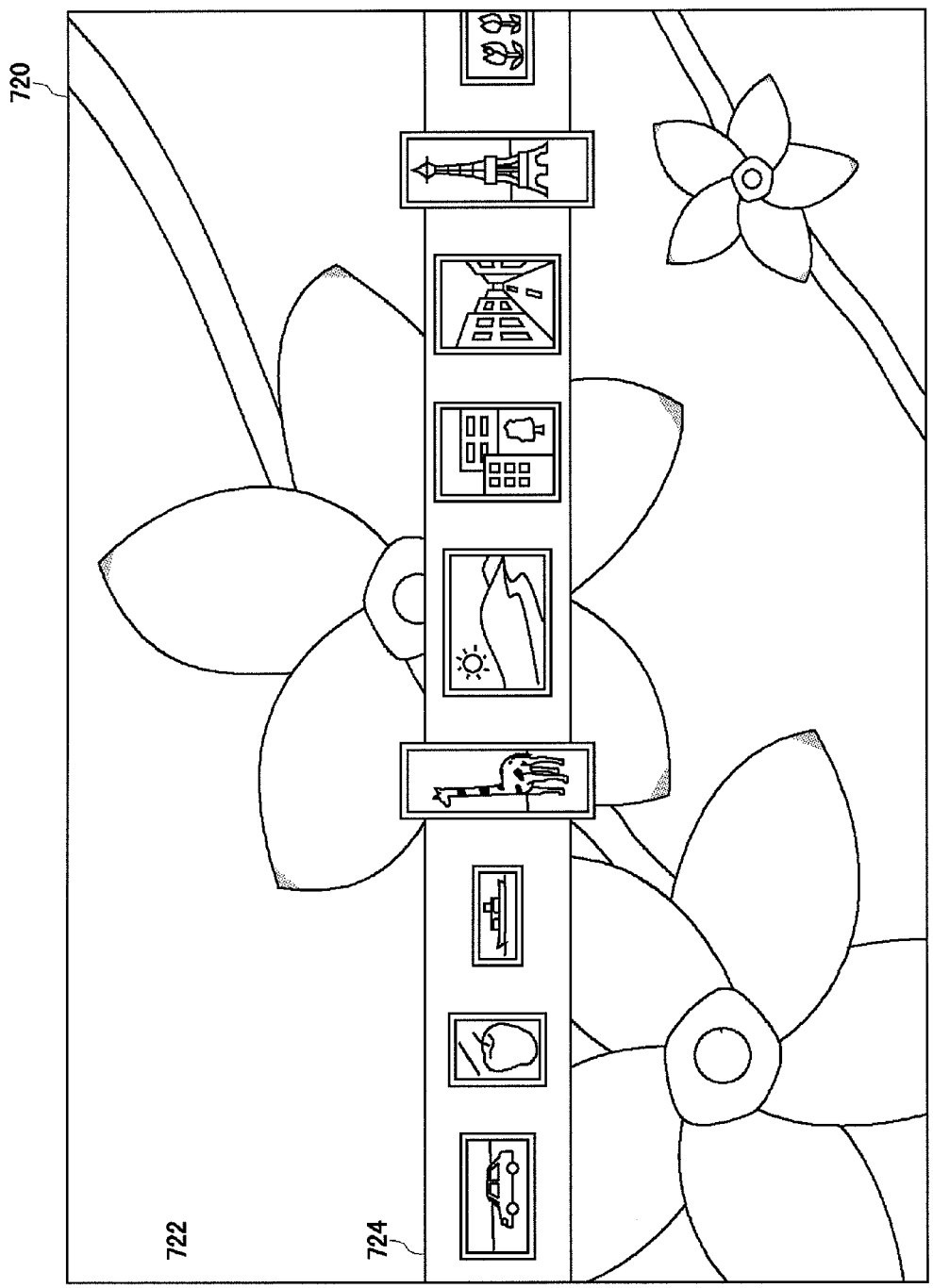
FIG. 5 is a view illustrating an example of a list-screen of image data outputted by a list-image display control unit.

FIG. 5 is a view illustrating an example of a list-screen 720 of the image data outputted by the list-image display control unit 708. The list-screen 720 generates a belt-shaped region 724 distinguishable from a background image 722 on the background image 722, so that the thumbnail images of the image data stored in the image data storage unit 204 are displayed on the belt-shaped region 724.

Herein, the list-image display control unit 708 acquires the aspect ratio the image data to be displayed on the list-screen 720 from the aspect ratio acquisition unit 604 through the integrated display control unit 702, so that the thumbnail image thereof is displayed on the belt-shaped region 724, while keeping the aspect ratio of the image data. A user can freely switches the thumbnail images displayed on the belt-shaped region 724 from one to another by clicking a non-displayed mouse or controller.

Further, the list-image display control unit 708 acquires the number of pixels of the image data to be displayed on the list-screen 720 from the number-of-pixel acquisition unit 606 through the integrated display control unit 702, so that the thumbnail image of the image data with more pixels is displayed, on the belt-shaped region 724, as a larger thumbnail image than that of the image data with less pixels. Specifically, the list-image display control unit 708 acquires the total number of pixels of every image data stored in the image data storage unit 204, so that the image data with the maximum pixels and that with the minimum pixels are specified in the ordinary images. The list-image display control unit 708 generates thumbnail images such that the area ratio of the thumbnail image of the image data with the maximum pixels to that of the image data with the minimum pixels in the ordinary images is within a predetermined range.

Herein, the "predetermined range" means a reference range that is defined to make a display of a list look better by suppressing a variation in the areas of the thumbnail images displayed on the list-screen 720. Although the reference range may be determined by experiments, it is determined such that, for example, the area of the thumbnail image of the image data with the maximum pixels is two times or less larger than that of the image date with the minimum pixels. Thereby, the resolution of the image data has a correlation with the magnitude relationship of the thumbnail images thereof, and accordingly a user can overlook the resolution of every image data stored in the image data storage unit 204. Also, because the aspect ratio of the thumbnail image displayed on the list-screen 720 is the same as that of the image data stored in the image data storage unit 204, the user can also overlook the outer shape of the image data.

The list-image display control unit 708 does not always display all the thumbnail images such that they are included in the belt-shaped region 724. For example, when the ratio of the height relative to the width of image data exceeds a predetermined ratio after the aspect ratio thereof, which has been acquired from the aspect ratio acquisition unit 604 through the integrated display control unit 702, has been analyzed, the list-image display control unit 708 displays the thumbnail image of the image data so as to protrude from the belt-shaped region 724.

Herein, the "predetermined ratio" means a reference ratio defined to display, on the list-screen 720, the characteristic of the outer shape of image data in a more emphasized manner. Although the reference ratio may be determined by experiments, the reference ratio is applied to, for example, the case where the ratio of the height to the width of image data is greater than three. Because it can be considered that the image satisfying the reference ratio is a panorama image, a user can overlook the types of image data on the list-screen 720.

Figure 6:
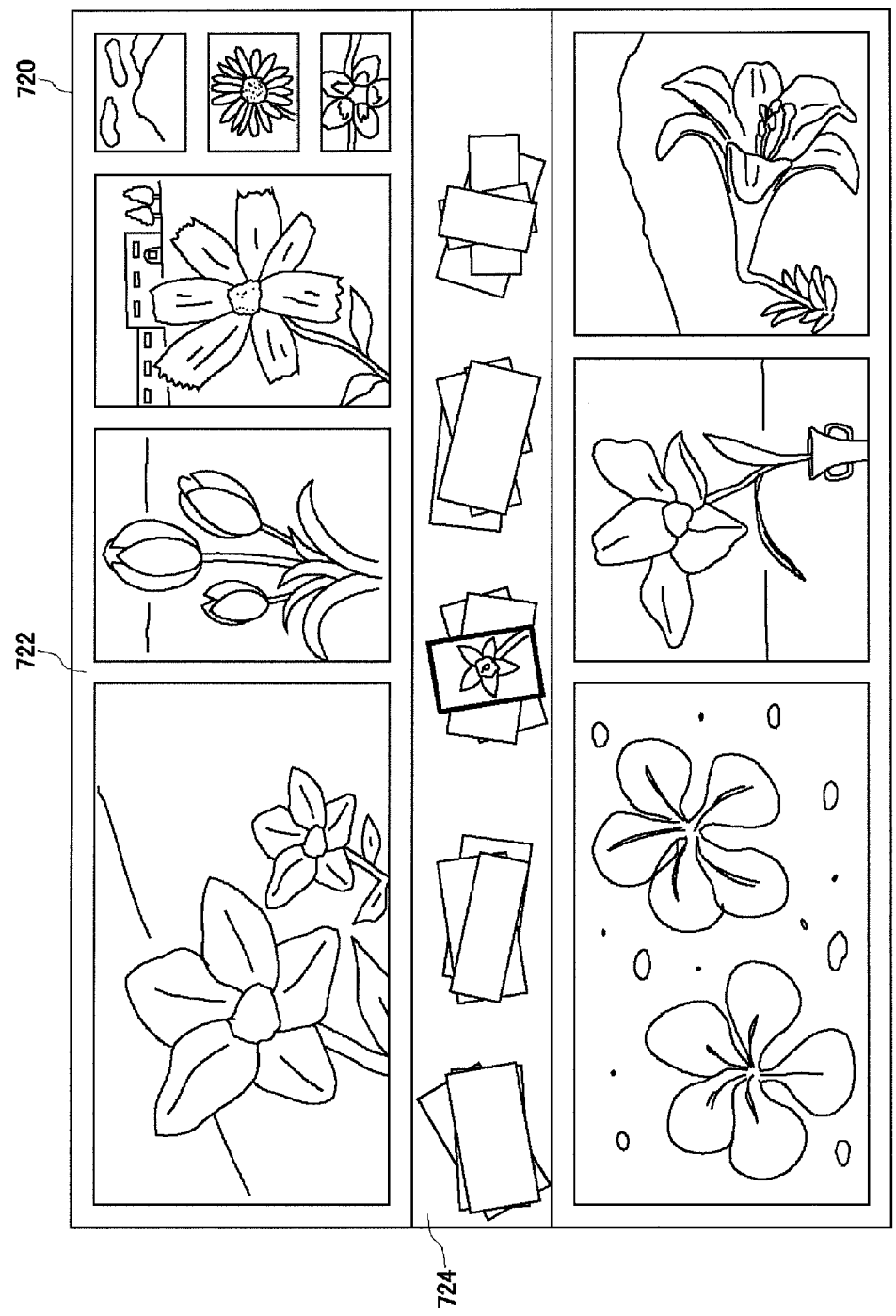
FIG. 6 is a view illustrating another example of the list-screen of the image data outputted by the list-image display control unit.

FIG. 6 is a view illustrating another example of the list-screen of the image data outputted by the list-image display control unit 708. The example illustrated in FIG. 6 illustrates a state in which the image classification unit 502 is classifying and dividing into groups the image data stored in the image data storage unit 204 based on the attribute information thereof. The aforementioned attribute information can be arbitrarily used in the division into groups. For example, the image data can be divided into groups based on the year when the image data were taken or on the specific person taken in the image data.

As illustrated in FIG. 6, the image groups generated by the division into groups by the image classification unit 502 are displayed on the belt-shaped region 724 that is distinguishable from the background, in a manner in which it is represented that the thumbnail images of the image data are piled up into bundles of images. The aspect ratio of each thumbnail image that forms the bundle of images is the same as that of the corresponding image data and the magnitude relationship between the thumbnail images have a correlation with that between the numbers of pixels of the corresponding image data. Thereby, a user can overlook in a group unit the image groups classified based on the attribute information. This is advantageous in terms of being able to quickly grasp the total image of the image data stored in the image data storage unit 204, when it is difficult to overlook the total image thereof only by a display of a list of each image because the number of the image data stored therein is increased.

When a user selects one of the bundles of images displayed on the belt-shaped region 724 through the direction receiving unit 800, the list-image display control unit 708 displays the selected bundle of images in a different manner from other bundles of images, in which the selected bundle of images is focused. Specifically, for example, the thumbnail image of the image data included in the selected image group is displayed on the top surface of the selected bundle of images. Further, the list-image display control unit 708 randomly extracts the predetermined number of sheets of image data from the selected image group such that an image in which the extracted image data are arranged is displayed as the background image 722.

Herein, the "predetermined number of sheets" means the reference number of sheets by which, when a so-called montage image of an image group is generated, each thumbnail image has the extent of size in which each thumbnail image can be recognized. Because the reference number of sheets is changed in accordance with the size of a display device and the number of pixels of image data, it may be determined by experiments. A specific example of the "predetermined number of sheets" is, for example, nine. A user can view part of the image data in the selected image group as a sample image, thereby it becomes possible for the user to grasp the reference or theme by which the image group is divided into a group. It may be made that the "predetermined number of sheets" is freely set by a user in accordance with his/her preference. In this case, the direction receiving unit 800 acquires a direction from the user to output to the list-image display control unit 708.

Referring back to the descriptions of FIG. 4, the slide show display control unit 704 further includes a two-dimensional slide show display control unit 710 and a three-dimensional slide show display control unit 712. When a user issues, through the direction receiving unit 800, the direction that a two-dimensional slide show should be initiated while the list-image display control unit 708 is displaying the list-screen 720, the two-dimensional slide show display control unit 710 initiates a two-dimensional slide show. Specifically, the two-dimensional slide show display control unit 710 displays, sequentially one by one, the image data included in the image group selected by the user on the display device. When a two-dimensional slide show is initiated while the thumbnail images of the whole image data stored in the image data storage unit 204, not the image groups thereof, are being displayed on the list-screen 720, the whole image data stored in the image data storage unit 204 is considered to be a single image group.

When the two-dimensional slide show display control unit 710 initiates a two-dimensional slide show, the music data reproducing unit 302 reproduces the music data stored in the music data storage unit 202. The music data analyzing unit 304 analyzes the characteristic data of the music reproduced by the music data reproducing unit 302. The two-dimensional slide show display control unit 710 acquires the characteristic data of the music analyzed by the music data analyzing unit 304 to control a timing when image data to be displayed is switched in accordance with the characteristic data of the music. By making a timing when image data is switched be changed with a change in the characteristic data of music, it becomes possible to present a different atmosphere to a user even if the same image group is reproduced by using a two-dimensional slide show.

Specifically, for example, when the speed of the tempo of music is adopted as the characteristic data of the music, the two-dimensional slide show display control unit 710 advances a timing when image data is switched, as the tempo of the music data is faster, and vice versa. Because the correlativity between the tempo of music and the timing when a two-dimensional slide show is switched is increased, it becomes possible for a user to listen to the music suitable for his/her feeling and simultaneously to view image data.

Another example of a two-dimensional slide show will be described. When a specific person is taken in the image data selected by a user at the initiation of a two-dimensional slide show, the two-dimensional slide show display control unit 710 retrieves the database of attribute information stored in the image data storage unit 204 to collect the image data in which the person is taken. The two-dimensional slide show display control unit 710 performs the aforementioned two-dimensional slide show of the collected image group. In this case, the age of the person when the picture was taken is displayed as well as the display of the image data. This is advantageous in terms of being able to present a brief album regarding the person.

When a user issues, through the direction receiving unit 800, the direction that a three-dimensional slide show should be initiated after selecting an arbitrary thumbnail image, while the list-image display control unit 708 is displaying the list-screen 720 to display the thumbnail images of the whole image data stored in the image data storage unit 204, the three-dimensional slide show display control unit 712 initiates a three-dimensional slide show. Specifically, the three-dimensional slide show display control unit 712 acquires the attribute information of the image data corresponding to the selected thumbnail image, and then acquires the predetermined number of sheets of image data including the attribute information that are associated with the acquired attribute information.

Herein, the "attribute information that are associated" means any of the attribute information having an item common in the attribute information of the image data corresponding to the selected thumbnail image; however, it is preferable that the attribute information can provide an element of surprise and awareness to a user because the image data having such attribute information are not usually edited as an album. Examples of such attribute information include, for example, years when image data taken on the same day as the selected image data were taken. Thereby, this is advantageous in terms of being able to create an album, for example, such as "photos on every birthday".

Figure 7:
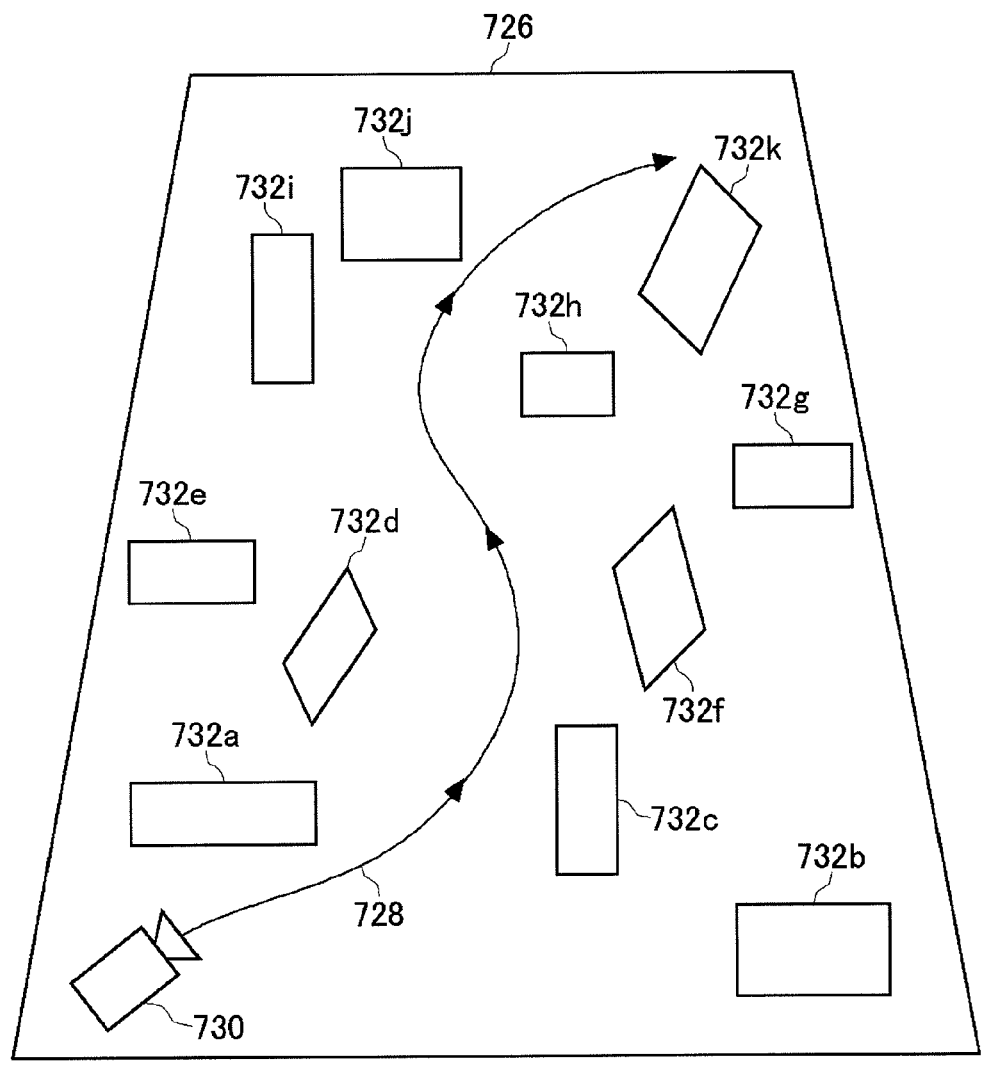
FIG. 7 is a view illustrating an example of a virtual three-dimensional space used in a three-dimensional slide show according to the embodiment.

The three-dimensional slide show display control unit 712 arranges, in a scattered manner, the acquired image data on a virtual three-dimensional space set in the non-illustrated work memory. FIG. 7 is a view illustrating an example of a virtual three-dimensional space 726 used in a three-dimensional slide show according to the embodiment. A camera 730, which is a virtual viewpoint moving on a virtually-installed rail 728, is present in the virtual three-dimensional space 726. FIG. 7 illustrates a state in which image data 732 collectively denoted by a reference numeral 732 are arranged in the virtual three-dimensional space 726 by the three-dimensional slide show display control unit 712.

Figure 8:
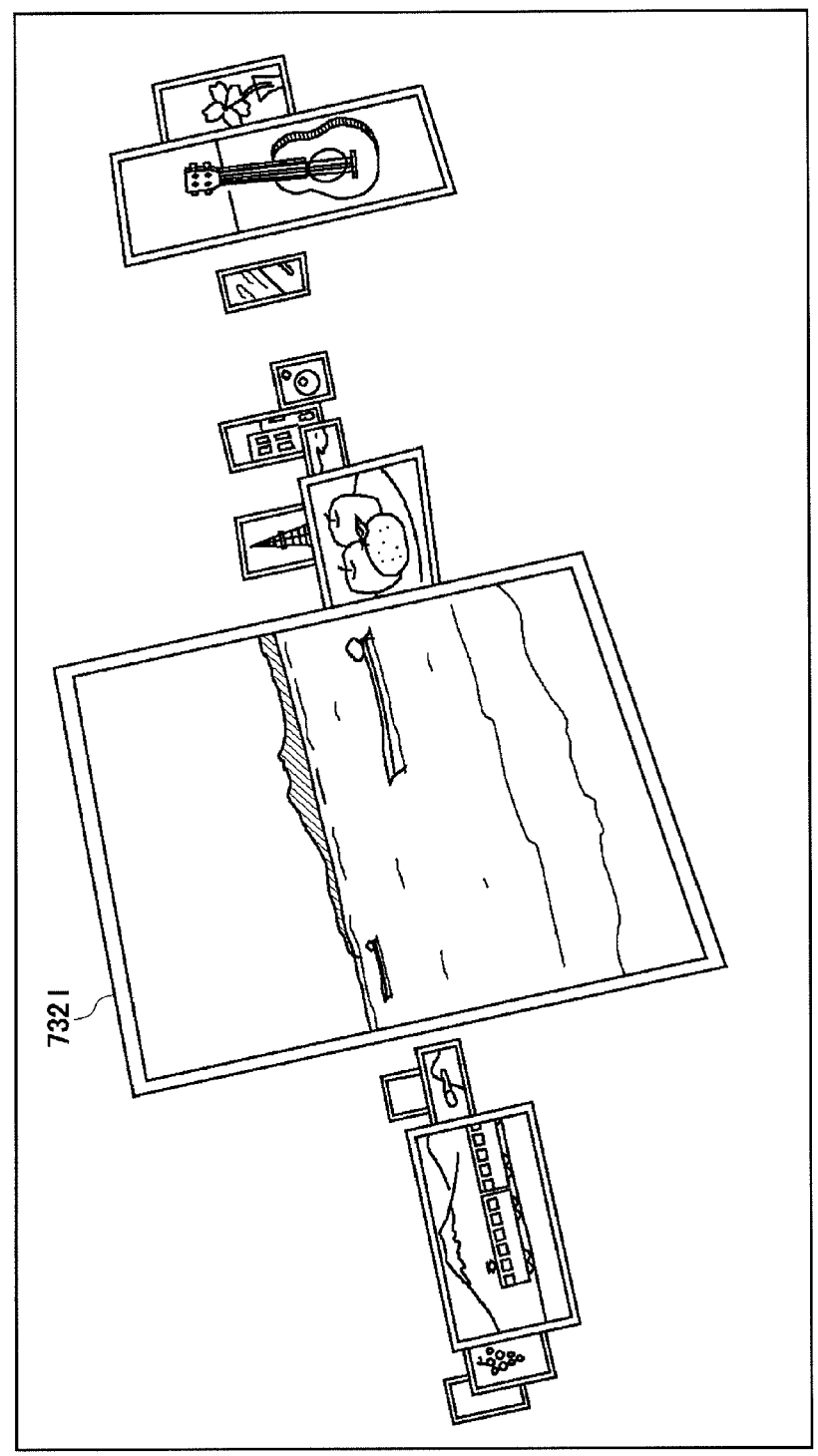
FIG. 8 is a view illustrating an example of the display screen of the three-dimensional slide show according to the embodiment.

The three-dimensional slide show display control unit 712 generates a video in which the image data 732 are being observed while the camera 730 is being moved along the rail 728, i.e., a walk-through video. FIG. 8 is a view illustrating an example of the display screen of the three-dimensional slide show according to the embodiment. As illustrated in FIG. 8, the image data 732 having various sizes are arranged in the virtual three-dimensional space 726 in various directions and in a scattered manner as if it were a forest of image data. A video generated by being observed from the viewpoint of the camera 730 moving therein is displayed as a three-dimensional slide show.

A user can issue, through the direction receiving unit 800, the direction that the movement of the camera 730, which is a virtual viewpoint, should be stopped to the three-dimensional slide show display control unit 712, while a three-dimensional slide show is being displayed. When acquiring the direction that the movement of the camera 730 should stopped, the three-dimensional slide show display control unit 712 stops the movement of the camera 730. Subsequently, the three-dimensional slide show display control unit 712 displays a video generated when the image data that is located, in the virtual three-dimensional space 726, at the closest position from the stopped camera 730 is viewed from the front of the image data.

Herein, the "image data that is located at the closest position from the camera 730" means the image data in which the distance between the positional coordinates of the center of the image data and that of the camera 730 is smallest in the image data arranged in the virtual three-dimensional space 726. In FIG. 8, because the image data 7321 is located at the closest position from the stopped camera 730, a video generated when the image data 7321 is viewed from the front thereof is to be displayed.

Thereby, it becomes possible to overlook, in a three-dimensional spread, the image data having the aforementioned associated attribute information, and accordingly a new awareness to the image data, which has been almost forgotten after being stored in the image data storage unit 204, can be presented to the user. The user can carefully observe the image data from the front thereof, the user being interested in the image data among the image data having the associated attribute information.

In the aforementioned descriptions, the case where the camera 730 is solely present as a virtual viewpoint has been described; however, it may be made that a three-dimensional video including parallax images is generated by setting two cameras. This is advantageous in terms of being able to present a video of the virtual three-dimensional space 726 to a user as a three-dimensional video having a depth by displaying the video on a display device, such as a three-dimensional television set.

Referring back to the descriptions of FIG. 4, the single image display control unit 706 further includes a two-dimensional image display control unit 714, a three-dimensional image display control unit 716, and a moving image display control unit 718.

When a user selects image data through the direction receiving unit 800 while the list-image display control unit 708 is displaying the list-screen 720, the integrated display control unit 702 refers to the attribute information of the image data, and then activates one of the two-dimensional image display control unit 714, the three-dimensional image display control unit 716 and the moving image display control unit 718 based on the type of the image data.

For example, when the image data selected by the user is an "ordinary image" or "panorama image", the integrated display control unit 702 activates the two-dimensional image display control unit 714. The two-dimensional image display control unit 714 displays the selected image data on the display device. When the selected image data is a "panorama image", the two-dimensional image display control unit 714 displays the whole image by sliding the panorama image data, just like panning the camera. Alternatively, it may be made that the panorama image data is appropriately reduced so as to be displayed at a time on the whole display device and then displayed. The user can appropriately select, through the direction receiving unit 800, one of the display modes in accordance with his/her preference.

When the image data selected by the user is a "three-dimensional image" including a parallax image for the left eye and that for the right eye in which an object has been taken from different viewpoints, the integrated display control unit 702 activates the three-dimensional image display control unit 716. The three-dimensional image display control unit 716 displays image data in accordance with the type of the display device. The types of the display device include, for example: display devices of the type using a known liquid crystal shutter glasses, and display devices of the type using a Lenticular lens and a Parallax Barrier. When the display device does not support a three-dimensional image, the three-dimensional image display control unit 716 outputs, for example, only a parallax image for the left eye on the display device.

When the image selected by the user is a "moving image", the integrated display control unit 702 activates the moving image display control unit 718. The moving image display control unit 718 decodes coded moving images to display on the display device. When the moving image is a three-dimensional video including parallax images, the moving image display control unit 718 changes an image to be outputted in accordance with the type of the display device in the same way as the three-dimensional image display control unit 716.

The functions mainly for viewing the image data stored in the image data storage unit 204 have been described in the aforementioned descriptions; however, the image processing apparatus 100 according to the embodiment also provides a user interface for arranging the image data stored in the image data storage unit 204. Specifically, when a user issues, through the direction receiving unit 800, the direction that editing of an album should be initiated while the list-image display control unit 708 is displaying the list-screen 720, the album editing unit 504 in FIG. 1 displays a user interface for editing an album on the display device.

Figure 9:
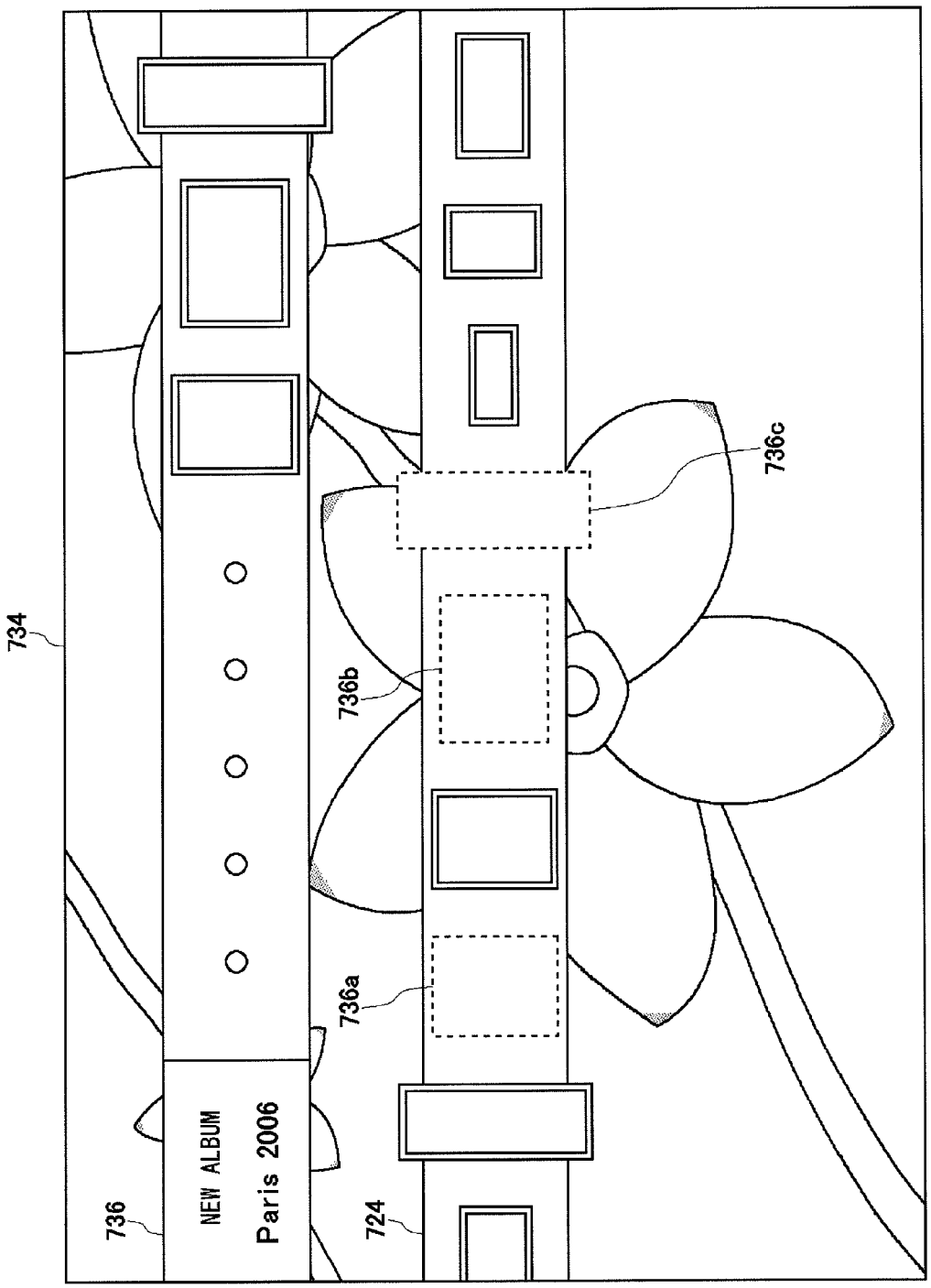
FIG. 9 is a view illustrating an example of an album editing screen outputted by an album editing unit.

FIG. 9 is a view illustrating an example of an album editing screen outputted by the album editing unit 504. The thumbnail images of image data are displayed in a list form on the belt-shaped region 724 in the same way as the list-screen 720. When the user select, through the direction receiving unit 800, the thumbnail image of image data displayed on the belt-shaped region 724, the album editing unit 504 simultaneously displays the same image as the thumbnail image of image data on a second display region 736 that is different from the belt-shaped region 724.

When acquiring, from the direction receiving unit 800, a selection of a thumbnail image by the user during editing of an album, the list-image display control unit 708 displays, on the display device, the thumbnail image of image data selected by the user and that of image data not selected by the user in different modes so as to distinguish one from another. In FIG. 9, the thumbnail images of image data selected by the user are illustrated as thumbnail images in a ghost state that are collectively denoted by a reference numeral 736.

Herein, the "ghost state" means a state in which the luminance, chroma, or contrast of the thumbnail image is low in comparison with that of the thumbnail image not selected by the user. By displaying the thumbnail image of image data selected by a user in a ghost state, it becomes possible to distinguish the thumbnail image of image data selected by the user from the thumbnail image of image data not selected by the user. Alternatively, it may be made that the thumbnail image of image data selected by the user is displayed in an emphasized manner in comparison with the thumbnail image not selected by the user, by increasing the luminance, chroma, contrast, or the like of the thumbnail image selected by the user.

Alternatively, the album editing unit 504 may display, during the editing of an album, the thumbnail image of image data selected by a user on the second display region 736 corresponding to the belt-shaped region 724. For example, when the belt-shaped region 724 and the second display region 736 form, on the display device, two belt-shaped regions that are parallel to each other, the horizontal positional coordinates of the thumbnail image displayed in the belt-shaped region 724 and that of the thumbnail image displayed in the second display region 736 are made to be equal to each other. Thereby, this is advantageous in terms of being able to easily confirm where the image data selected by a user is located in the material images.

As stated above, a user can make a choice of image data by viewing both the material image data to be included in an album and the image data already included in the album. Because the thumbnail images of the image data already included in the album can be distinguished among the material image data, this is advantageous in terms of being able to easily make a choice of image data. The case where an album is edited from the material images has been described in the aforementioned descriptions; however, the above user interface can also be used as a user interface for displaying and editing a "trash box" folder, the trash box being used for arranging unnecessary image data.

Figure 10:
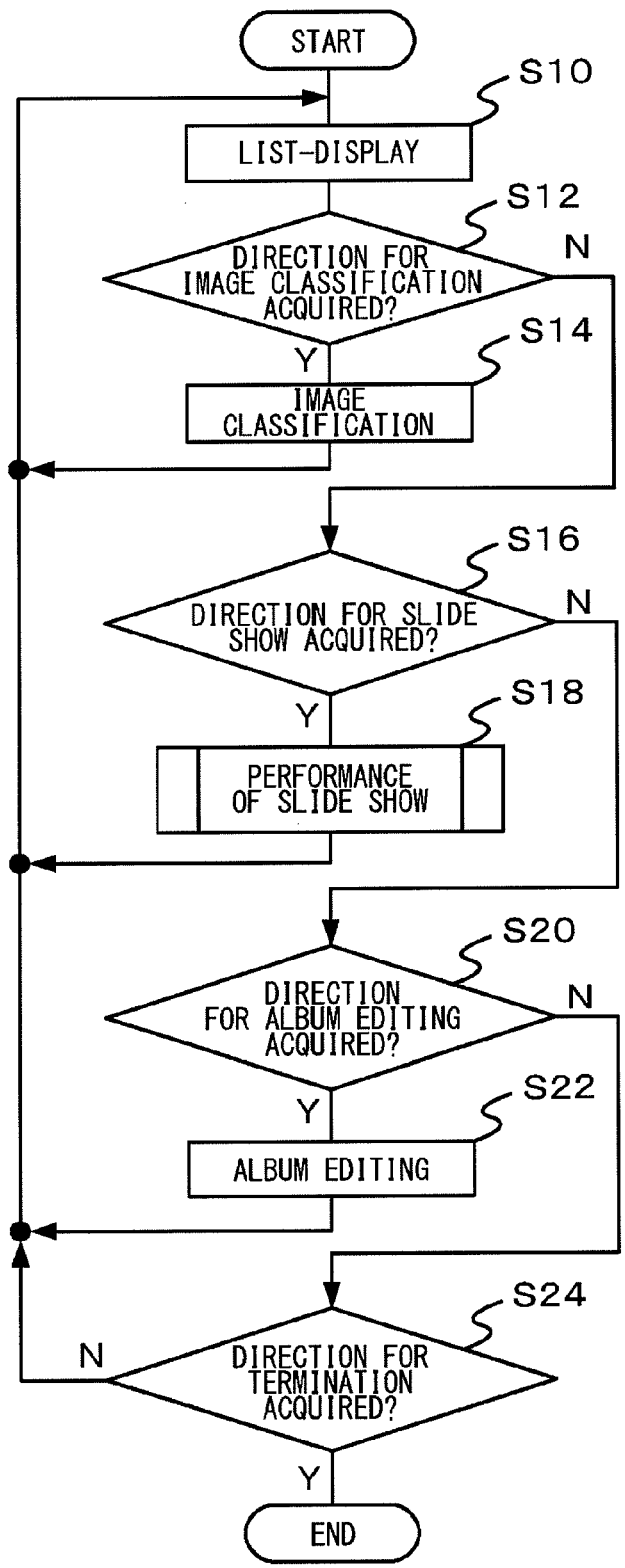
FIG. 10 is a flowchart illustrating, in a time-series manner, procedures of processing each unit of an image processing apparatus according to the embodiment.

FIG. 10 is a flowchart illustrating, in a time-series manner, procedures of processing each unit of the image processing apparatus 100 according to the embodiment. In the flowchart illustrated in FIG. 10, the procedures of processing each unit will be denoted by combinations of S, which means a step (initial letter of Step), and a number. In addition, when any determination processing is executed in the processing denoted by a combination of S and a number, and when a result of the determination is positive, the procedure is denoted by adding Y (initial letter of Yes) to the combination thereof, for example, by (S12/Y). Conversely, the result of the determination is negative, the procedure is denoted by adding N (initial letter of No) thereto, for example, by (S12/N). The processing in the flowchart is initiated when, for example, the image processing apparatus 100 is activated.

When the image processing apparatus 100 is activated, the integrated display control unit 702 makes the list-image display control unit 708 display a list of the whole image data stored in the image data storage unit 204 (S10). When the direction that the image data should be classified is acquired from a user during the display of a list (S12/Y), the image classification unit 502 refers to the database of attribute information stored in the list-image display control unit 708 based on the classification key acquired from the user such that the image data is classified into one or more image groups (S14).

When the direction that a slide show should be displayed, not the direction that the image data should be classified (S12/N), is acquired during the display of a list (S16/Y), the slide show display control unit 704 performs a slide show (S18). When the direction that an album should be edited, not the direction that a slide show should be displayed (S16/N), is acquired (S20/Y), the album editing unit 504 displays the user interface for editing an album (S22). When the direction that an album should be edited is not acquired (S20/N), it advances to the next step S24.

Before the direction that the image processing apparatus 100 should be terminated is acquired from a user through the direction receiving unit 800 (S24/N), the image processing apparatus 100 continues the aforementioned processing steps. When the direction that the image processing apparatus 100 should be terminated is acquired from a user through the direction receiving unit 800 (S24/Y), the processing is ended.

Figure 11:
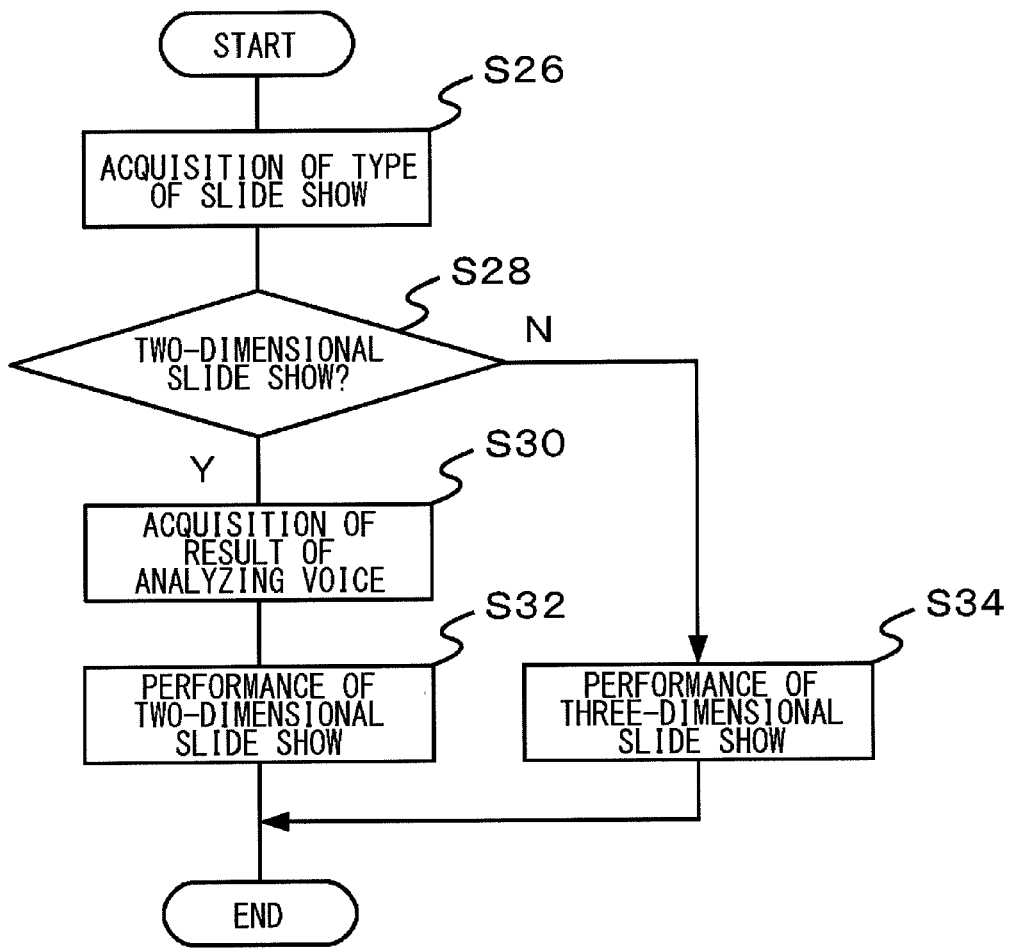
FIG. 11 is a flowchart illustrating, in a time-series manner, procedures of processing slide-show display.

FIG. 11 is a flowchart illustrating, in a time-series manner, the procedures of processing a slide show display in the slide show display control unit 704, which illustrates the details of S18 in FIG. 10. The integrated display control unit 702 acquires, through the direction receiving unit 800, the type of the slide show to be performed from a user (S26). Herein, the "type of the slide show" means a two-dimensional slide show or a three-dimensional slide show.

When the direction that a two-dimensional slide show should be performed is acquired from a user (S28/Y), the two-dimensional slide show display control unit 710 is activated by the integrated display control unit 702 to acquire the result of analyzing music data from the music data analyzing unit 304 (S30). Subsequently, the two-dimensional slide show display control unit 710 performs a two-dimensional slide show simultaneously with the reproduction of music data by the music data reproducing unit 302 (S32).

When the direction that a three-dimensional slide show should be performed is acquired from a user (S28/N), the three-dimensional slide show display control unit 712 is activated by the integrated display control unit 702 to perform a three-dimensional slide show (S34). When the slide show performed by the two-dimensional slide show display control unit 710 or the three-dimensional slide show display control unit 712 is terminated, the processing is ended.

The operations with the aforementioned configuration will be described with reference to FIG. 12.

Figure 12:
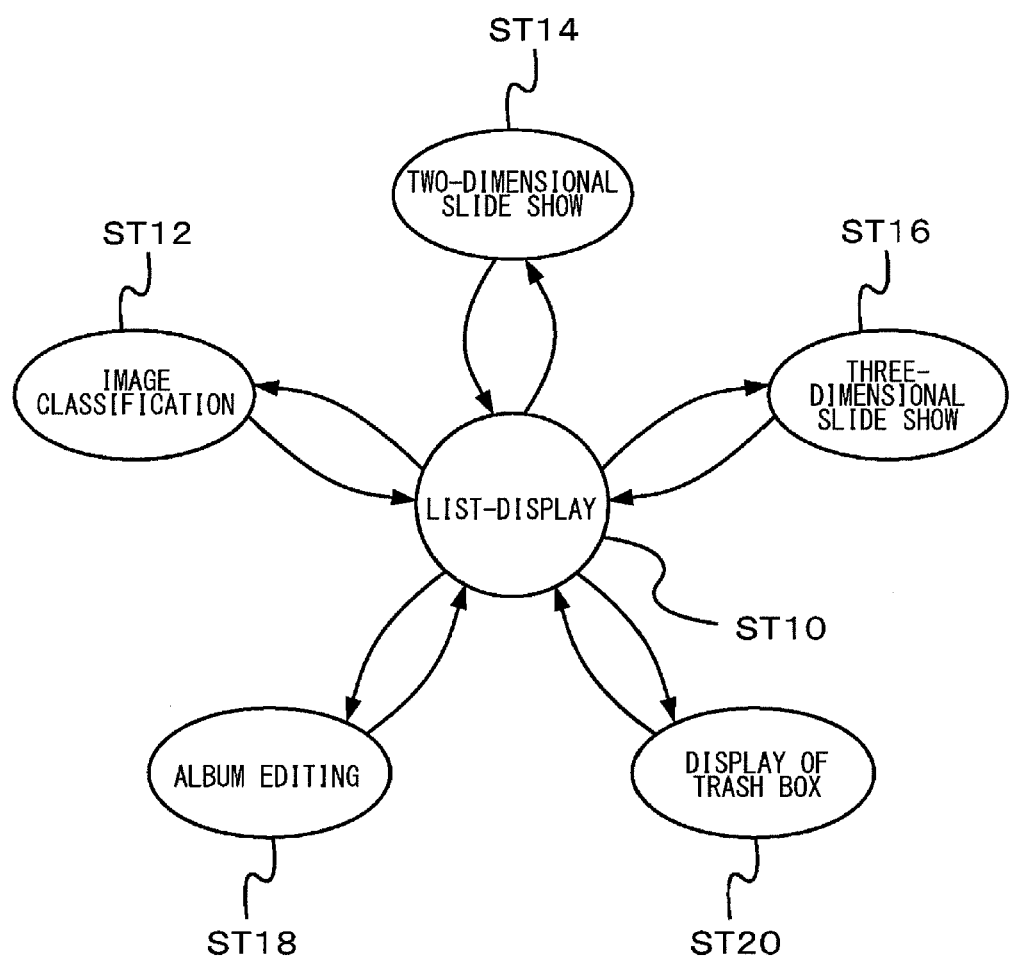
FIG. 12 is a state transition view illustrating transitions of states that the image processing apparatus according to the embodiment can take.

FIG. 12 is a state transition view illustrating transitions of states that the image processing apparatus 100 according to the embodiment can take. In the state transition view illustrated in FIG. 12, the states that the image processing apparatus 100 can take will be denoted by combinations of ST, which means a state (abbreviation of STatus), and a number.

When a user activates the image processing apparatus 100 according to the embodiment, the integrated display control unit 702 activates the list-image display control unit 708 to make the image processing apparatus 100 be in a display of a list state ST10. In the display of a list state ST10, a user interface as illustrated in FIG. 5 is displayed on the display device. The user can have the image processing apparatus 100 make a transition to the below-described five states by operating a controller, etc., with the display of a list state ST10 being a starting point. That is, the five states include an image classification state ST12, a two-dimensional slide show state ST14, a three-dimensional slide show state ST16, an album editing state ST18, and a trash box display state ST20.

When a user inputs a classification key by operating a controller, etc., in the image classification state ST12, the image classification unit 502 classifies the image data recorded in the image data storage unit 204. When the image classification unit 502 classifies the image data, the image classification state ST12 automatically makes a transition to the display of a list state ST10. Herein, when the image classification state ST12 makes a transition to the display of a list state ST10, a state in which the image data recorded in the image data storage unit 204 are classified into groups based on the attribute information thereof, is displayed on the display device as illustrated in FIG. 6. Of course, when a user issues the direction that the thumbnail images of the all image data should be displayed in a list form, instead of the classification of the image data, in the image classification state ST12, the user interface as illustrated in FIG. 5 is displayed.

When the user issues the direction that a two-dimensional slide show should be performed in the display of a list state ST10, the two-dimensional slide show display control unit 710 performs a two-dimensional slide show, and the image processing apparatus 100 makes a transition to the two-dimensional slide show state ST14. When the two-dimensional slide show is terminated, the image processing apparatus 100 automatically returns to the display of a list state ST10. Likewise, when the user issues the direction that a three-dimensional slide show should be performed in the display of a list state ST10, the three-dimensional slide show display control unit 712 performs a three-dimensional slide show, and the image processing apparatus 100 makes a transition to the three-dimensional slide show state ST16. When the three-dimensional slide show is terminated, the image processing apparatus 100 automatically returns to the display of a list state ST10.

Herein, a restriction may be added in which the display of a list state ST10 can make a transition to the three-dimensional slide show state ST16 only in the state where, in the display of a list state ST10, the thumbnail images of all the image data are displayed in a list form instead of the classification of the image data. It is because a new awareness is more likely to occur by selecting the image data to be displayed in a three-dimensional slide show from a population as large as possible, since a three-dimensional slide show is a user interface including the viewpoint of providing a new awareness to a user as stated above.

When a user issues the direction that album editing should be performed in the display of a list state ST10, the album editing unit 504 displays a user interface for editing an album on the display device, and the image processing apparatus 100 makes a transition to the album editing state ST18. When the album editing is terminated, the image processing apparatus 100 automatically returns to the display of a list state ST10. Likewise, when a user issues, in the display of a list state ST10, the direction that the trash box should be edited, a non-illustrated trash box editing unit displays, on the display device, a similar user interface as that for album editing, and the image processing apparatus 100 makes a transition to the trash box display state ST20. When the trash box editing is terminated, the image processing apparatus 100 automatically returns to the display of a list state ST10.

As stated above, by making it possible that, to the states other than the display of a list state ST10 (the image classification state ST12, the two-dimensional slide show state ST14, the three-dimensional slide show state ST16, the album editing state ST18, and the trash box display state ST20), only the display of a list state ST10 makes a transition, it becomes possible to provide a unified user interface to a user in which the display of a list state ST10 is a starting point.

According to the embodiment, a technique in which a large amount of digital image data can be readily managed can be provided as stated above.

The present invention has been described above based on the preferred embodiment. The aforementioned embodiment has been described for exemplary purpose only, and is by no means intended to be interpreted restrictively. Rather, it can be readily understood by a person skilled in the art that various modifications may be made by making various combinations of the aforementioned components or processes, which are also encompassed in the scope of the present invention.

In the aforementioned descriptions, the case where the list-image display control unit 708 displays the thumbnail images of the image data stored in the image data storage unit 204 on the belt-shaped region 724, which can be distinguished from the background image 722, has been described; however, the region in which the thumbnail images are displayed may have a shape other than a belt shape. For example, the list-image display control unit 708 displays thumbnail images in the whole display region so as to wholly cover the background. In this case, the number of the thumbnail images presented to a user can be increased in comparison with the case where thumbnail images are displayed in the belt-shaped region 724, and hence this is advantageous when a user intends to quickly overlook the whole image data stored in the image data storage unit 204.

The case where the music data reproducing unit 302 reproduces music data simultaneously with the performance of a two-dimensional slide show by the two-dimensional slide show display control unit 710 has been described in the above descriptions; however, the music data reproducing unit 302 may reproduce music data when the three-dimensional slide show display control unit 712 performs a three-dimensional slide show. In this case, the three-dimensional slide show display control unit 712 acquires, from the music data analyzing unit 304, the result of analyzing the music data to changes a mode of performing a three-dimensional slide show in accordance with the result thereof. For example, as the tempo of music data is faster, the moving speed of the camera 730 that moves within the virtual three-dimensional space 726 is increased. This is advantageous in terms of being able to listen to the music suitable for the feeling of a user and simultaneously to view a three-dimensional slide show, because the correlativity between the tempo of music and the rate of progression of the three-dimensional slide show is increased.

The case where the image classification unit 502 classifies image data based on the attribute information provided to the image data has been described in the above descriptions; however, the image classification unit 502 may classify the image data to which no attribute information is provided as one group. In this case, when the image data to which no attribute information is provided is newly stored in the image data storage unit 204, the image classification unit 502 collectively presents these image data to a user. This is advantageous to the user in terms of being able to manually edit attribute information.

The fact that, of the attribute information provided to image data, when the "display state" is the "non-display", the image data can be viewed only in the history folder, has been described in the above descriptions; however, the image classification unit 502 may store particular images in the image data storage unit 204 and simultaneously provide the attribute of "non-display" to the particular images automatically. The "particular images" means, for example, either of JPEG images corresponding to a three-dimensional image and JPEG images corresponding to a Raw image. This is advantageous in terms of being able to prevent the redundancy due to the display of a list of similar image data.

The case where the list-image display control unit 708 displays, on the belt-shaped region 724, the thumbnail image of the image data with more pixels as a larger thumbnail image than that of the image data with less pixels has been described in the above descriptions. Such a thumbnail image is generated by the list-image display control unit 708 reducing the image data; however, the list-image display control unit 708 may change the enlargement/reduction ratio in accordance with the number of pixels of the original image data. Herein, the "enlargement/reduction ratio" means the ratio of the number of pixels in the short side of the thumbnail image to that of the original image data when the thumbnail image is generated by reducing the image data while the aspect ratio of the image data is being kept. As the enlargement/reduction ratio is smaller, the generated thumbnail image becomes smaller.

Figures 13A, 13B:
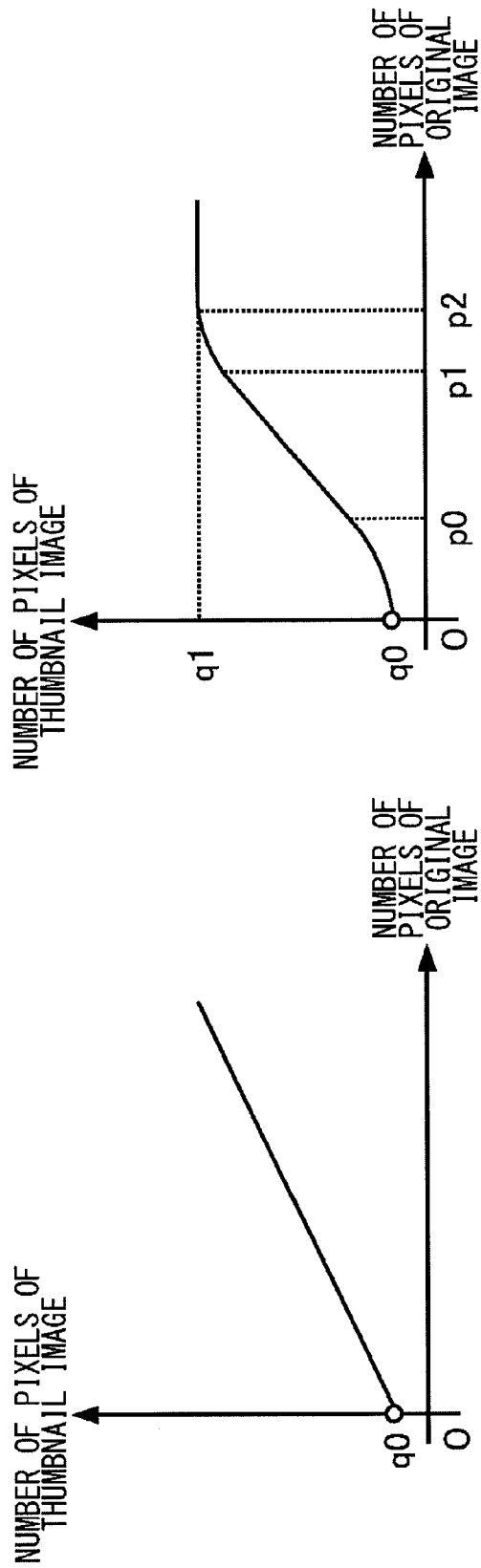
FIGS. 13A and 13B are views illustrating examples of the relationship between the number of pixels of the original image data and that of the corresponding thumbnail image when the thumbnail image is generated.

FIG. 13A is a view illustrating an example of the relationship between the number of pixels of the original image data and that of the corresponding thumbnail image when the thumbnail image is generated. FIG. 13A illustrates the fact that the variation in the number of pixels of the thumbnail image is smaller than that of the original image data, as a result of reducing the enlargement/reduction ratio as the number of pixels of the original image data is larger. Further, FIG. 13A illustrates that the minimum of the number of pixels of the generated thumbnail image is q0 pixels.

FIG. 13B is a view illustrating another example of the relationship between the number of pixels of the original image data and that of the corresponding thumbnail image when the thumbnail image is generated. In the same way as the example of FIG. 13A, the minimum of the number of pixels of the generated thumbnail image is q0 pixels. In the graph illustrated in FIG. 13B, there exist inflection points when the number of pixels of the original image is p0, p1 and p2. When the number of pixels of the original image is smaller than or equal to p0, the increase in the enlargement/reduction ratio is increased as the number of pixels thereof becomes smaller, thereby the change in the number of pixels of the thumbnail image becomes moderate. When the number of pixels of the original image is between p0 and p1, the relationship between the two is the same as the case illustrated in FIG. 13A.

When the number of pixels of the original image is between p1 and p2, the decrease in the enlargement/reduction ratio is increased as the number of pixels thereof becomes larger, thereby the change in the number of pixels of the generated thumbnail image becomes moderate. When the number of pixels of the original image is larger than p2, the list-image display control unit 708 determines the enlargement/reduction ratio such that the number of pixels of the thumbnail image becomes a constant value of q1 pixels.

In each of the examples illustrated in FIGS. 13A and 13B, the variation in the number of pixels of the thumbnail image is smaller than that of the original image data. As a result, well-uniformed display can be achieved when the thumbnail images are displayed in a list form while the magnitude relationship of the numbers of pixels of the original image is being kept. Thereby, it can be prevented that, when there is a great difference between the numbers of pixels of the original images to be displayed, it becomes difficult to view the thumbnail image with less pixels because it is flattened.

What is claimed is:

1. An image display apparatus comprising:
   an image classification unit configured to classify image data to which attribute information is added into groups based on the attribute information so as to generate one or more image groups;
   a display control unit configured to display, on a display device, a list of a plurality of thumbnail images of the image data included in each of the image groups generated by the image classification unit, in a manner in which the plurality of thumbnail images are piled up into a bundle of images for every image group; and
   a direction receiving unit configured to receive a selection for one of the image groups generated by the image classification unit; wherein
   the display control unit is configured to:
   acquire a predetermined number of sheets of image data from the selected image group received by the direction receiving unit;
   display, on the display device, the sheets of image data as a background image in which the sheets of image data are arranged;
   display each of the bundle of images on a belt-shaped region that is distinguishable from the background image; and
   display, together with the sheets of image data arranged as the background image, a thumbnail image of the image data included in the selected image group on a top surface of a bundle of the selected image group.

2. The image display apparatus according to claim 1 further comprising:
   a continuous display control unit configured to sequentially display, on the display device, the sheets of image data included in the selected image group; and
   a music data reproducing unit configured to reproduce music data simultaneously with the display of the sheets of image data by the continuous display control unit, wherein
   the continuous display control unit controls a time when image data is switched in accordance with the characteristics of music data.

3. The image display apparatus according to claim 2, wherein
   the display control unit advances the time when image data is switched as the tempo of the music data is faster.

4. An image display apparatus comprising:
   a display of a list control unit configured to display, on a display device, a list of a plurality of thumbnail images of the image data to which attribute information is added, the image data being stored in a storage device;
   a direction receiving unit configured to acquire a user selection for the image data; and
   a display control unit configured to: acquire, from the storage device, a predetermined number of sheets of image data including attribute information associated with the attribute information included in a selected image; arrange the predetermined number of sheets of image data within a virtual three-dimensional space; display, on the display device, a walk-through video of the predetermined number sheets of image data; stop the movement of the virtual viewpoint when the direction receiving unit acquires the direction that the movement of the virtual viewpoint should be stopped; and then display an image located at the closest position from the virtual viewpoint in the virtual three-dimensional space; wherein
   the list control unit is configured to display, on the display device, a list of a plurality of thumbnail images of the image data included in each of image groups generated by classifying image data to which attribution information is added into groups based on the attribute information, in a manner in which the plurality of thumbnail images are piled up into a bundle of images for every image group;
   the direction receiving unit is configured to receive a selection for one of the image groups; and
   the display control unit is configured to:
   acquire a predetermined number of sheets of image data from the selected image group received by the direction receiving unit;
   display, on the display device, the sheets of image data as a background image in which the sheets of image data are arranged;
   display each of the bundle of images on a belt-shaped region that is distinguishable from the background image; and
   display, together with the sheets of image data arranged as the background image, a thumbnail image of the image data included in the selected image group on the top surface of a bundle of the selected image group.

5. An image display method executable by a processor, comprising the steps of:

generating one or more of image groups by classifying image data to which attribution information is added into groups based on the attribute information;

displaying, on a display device, a list of a plurality of thumbnail images of the image data included in each of the generated image groups, in a manner in which the plurality of thumbnail images are piled up into a bundle of images for every image group; and receiving a selection for one of the image groups; wherein the displaying step comprises:

acquiring a predetermined number of sheets of image data from the selected image group;

displaying, on the display device, the sheets of image data as a background image in which the sheets of image data are arranged;

displaying each of the bundle of images on a belt-shaped region that is t istinguishable from e background image; and displaying, together with the sheets of image data arranged as the background image, a thumbnail image of the image data included in the selected image group on the top surface of a bundle of the selected image group.

6. A non-transitory computer-readable recording medium encoded with a program, the program comprising:

an image classification module configured to generate one or more of image groups by classifying image data to which attribute information is added into groups based on the attribute information;

a display control module configured to display, on a display device, a list of a plurality of thumbnail images of the image data included in each of the generated image groups, in a manner in which the plurality of thumbnail images are piled up into a bundle of images for every image group; and a direction receiving module configured to receive a selection for one of the image groups generated by the image classification unit; wherein the display control module is configured to:

acquire a predetermined number of sheets of image data from the selected image group;

display, on the display device, the sheets of image data as a background image in which the sheets of image data are arranged;

display each of the bundle of images on a belt-shaped region that is distinguishable from the background image; and display, together with the sheets of image data arranged as the background image, a thumbnail image of the image data included in the selected image group on the top surface of a bundle of the selected image group.

\* \* \* \* \*